United States Patent
Nakagome et al.

(12) 
(10) Patent No.: US 7,314,107 B2
(45) Date of Patent: Jan. 1, 2008

(54) AIR CLEANER STRUCTURE

(75) Inventors: Hiroshi Nakagome, Saitama (JP); Katsuyuki Konishi, Saitama (JP); Akihiro Hamada, Saitama (JP); Kaori Inada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 423 days.

(21) Appl. No.: 10/978,420

(22) Filed: Nov. 2, 2004

(65) Prior Publication Data

US 2005/0098142 A1 May 12, 2005

(30) Foreign Application Priority Data

Nov. 6, 2003 (JP) ............................. 2003-376917

(51) Int. Cl.
*B60K 13/02* (2006.01)
(52) U.S. Cl. .................................. 180/68.3; 180/69.25
(58) Field of Classification Search ............... 180/68.1, 180/68.2, 68.3, 69.25, 219, 229; 454/284
See application file for complete search history.

(56) References Cited

U.S. PATENT DOCUMENTS

| | | | | |
|---|---|---|---|---|
| 4,366,878 A | * | 1/1983 | Warf | 180/68.3 |
| 4,982,973 A | * | 1/1991 | Saito et al. | 280/152.1 |
| 5,794,733 A | * | 8/1998 | Stosel et al. | 180/68.1 |
| 6,276,482 B1 | * | 8/2001 | Moriya et al. | 180/229 |
| 6,409,783 B1 | * | 6/2002 | Miyajima et al. | 55/385.3 |
| 6,543,525 B2 | * | 4/2003 | Kalbacher | 165/140 |
| 7,059,438 B1 | * | 6/2006 | Sheets | 180/68.1 |
| 7,111,701 B2 | * | 9/2006 | Nagashii et al. | 180/219 |
| 2005/0051375 A1 | * | 3/2005 | Momosaki | 180/219 |

FOREIGN PATENT DOCUMENTS

EP 0 500 140 A1 8/1992
JP 2663251 B2 6/1997

* cited by examiner

*Primary Examiner*—Frank Vanaman
(74) *Attorney, Agent, or Firm*—Birch, Stewart, Kolasch & Birch, LLP (57) ABSTRACT

An air cleaner structure that is capable of achieving smooth air-intake capability while separating water contained in air to supply clean air to the engine side. A lower half member of an air-intake duct is, when viewed from above, provided with a central partition and partitions located symmetrically in the vicinity of the central partition, partitions located near both ends, and narrowing passages and widening passages surrounded by the partitions. Air enters from the front of the vehicle body and flows like eddy currents from outlet ports of the widening passages to the outlet ports of the narrowing passages like eddy currents. Thus, coarse particulate and dust contained in the air stay on the outlet port side of the air-intake duct.

20 Claims, 7 Drawing Sheets

AIR CLEANER STRUCTURE

BACKGROUND OF THE INVENTION

CROSS-REFERENCE TO RELATED APPLICATIONS

The present non-provisional application claims priority under 35 USC 119 to Japanese Patent Application No. 2003-376917 filed on Nov. 6, 2003 the entire contents thereof is hereby incorporated by reference.

FIELD OF THE INVENTION

The present invention relates to an air cleaner structure for a motorcycle.

DESCRIPTION OF BACKGROUND ART

An air cleaner for a motorcycle is a device having a function for reducing or removing water taken into the air cleaner when it rains, or for reducing an air-intake sound of an engine.

Therefore, an important performance of the air cleaner is how water contained in the intake air can be removed by an element constituting the air cleaner or in an air-intake duct, which is a passage for introducing outside air.

An air cleaner of a type which accumulates water contained in intake air or rainwater in a surge tank that is provided in an intake duct and discharges the water therefrom is proposed in, for example, Japanese Patent No. 2663251.

Figure 7:
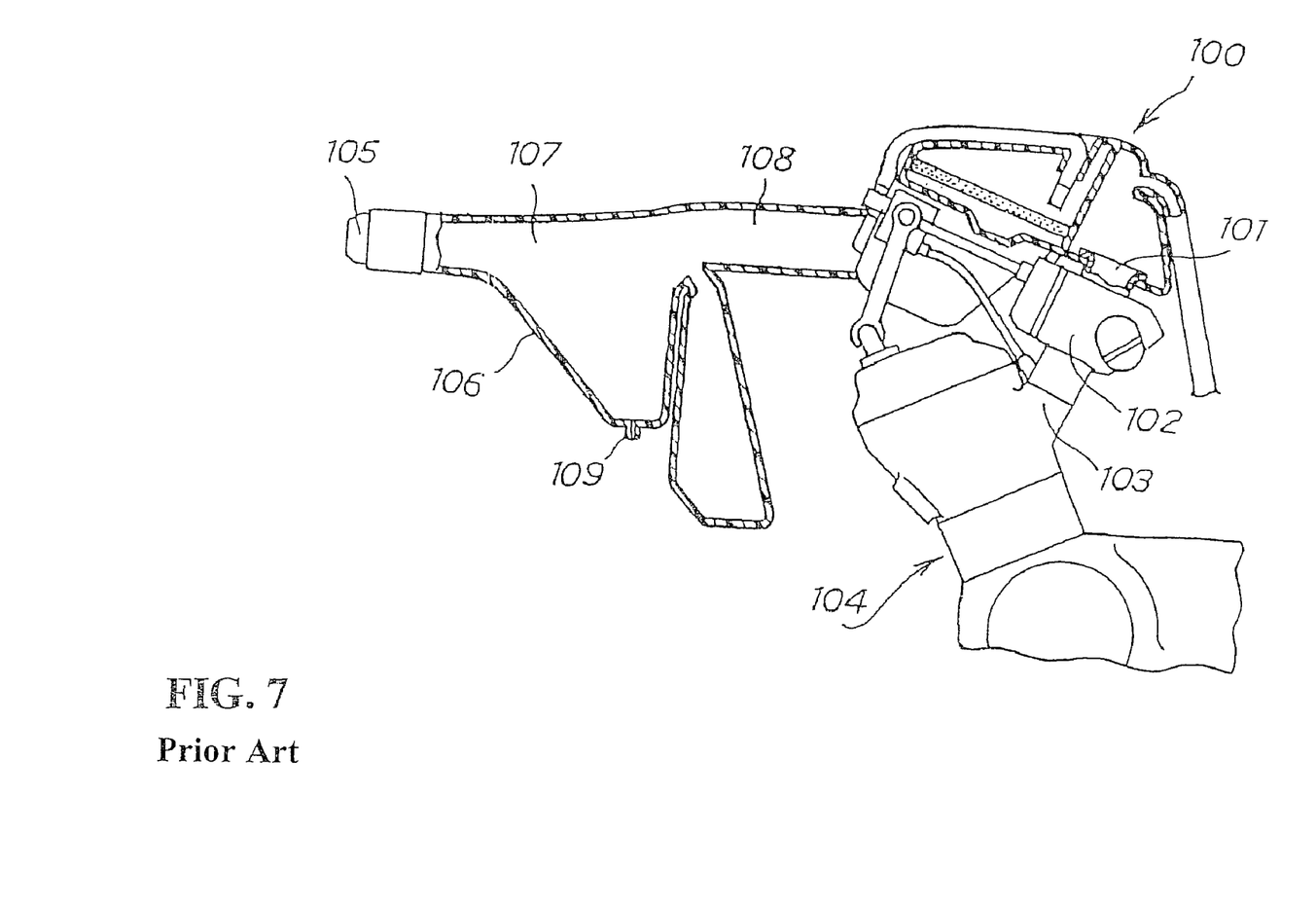
FIG. 7 is an explanatory drawing illustrating a basic structure of the background art.

Referring now to FIG. 7 of the present drawings that corresponds to a figure in Japanese Patent No. 2663251 an air cleaner 100 is a structure that is connected to an air-intake passage 101 provided below the air cleaner 100. A carburetor 102 is provided below the air-intake passage 101 with an engine 104 being provided below an air-intake hole 103.

The front portion of the air cleaner 100 includes an air intake port 105, a surge tank 106, an intake duct 107, and an air-flow passage 108. A drain 109 is provided for discharging water therefrom.

Outside air enters through the air-intake port 105 through the intake duct 107 the air-flow passage 108, and enters the air cleaner 100. In this process, water contained in the intake air is accumulated in the surge tank 106. Outside air that enters into the air cleaner 100 enters from the air-intake passage 101 into the carburetor 102, is converted into an air-fuel mixture, and is filled into the engine 104.

The air cleaner 100 in Japanese Patent No. 2663251 is provided with a surge tank 106 on the upstream side of the intake duct 107. The surge tank 106 separates rainwater or the like from the intake air. However, since the capacity of the surge tank 106 insignificantly large, there is a limit in the flexibility of designing the air cleaner.

SUMMARY AND OBJECTS OF THE INVENTION

Accordingly, it is an object of the present invention to provide an air cleaner structure which has flexibility in design and can achieve a smooth air-intake capability while keeping its function for separating rainwater or water contained in air.

The present invention provides an air cleaner structure to be mounted to a vehicle including an air-intake duct for introducing outside air provided at an inlet port of a cleaner case having an element for cleaning air integrated therein. The air intake duct includes partitions for partitioning the interior of the duct wherein the partitions are inclined with respect to an longitudinal axis of the vehicle body so that a narrowing passage is provided wherein the cross-sectional area of the flow channel is narrowed along the air flow and a widening passage of the cross-sectional area of the flow channel is widened along the air flow. Both passages are formed adjacent to each other.

The present invention provides the air-intake duct that has a vertically divided structure including an upper half member and a lower half member wherein the partitions are formed integrally with the upper half member and the lower half member, respectively.

The present invention provides the air intake duct with a cross section of substantially a laterally elongated square shape extending in the direction of the width of the vehicle when viewed from the front. A plurality of partitions are formed in the direction of the width of the vehicle.

In the present invention, the air-intake duct for introducing outside air disposed at the inlet port of the cleaner case includes an element for cleaning air integrated therein. The partitions for partitioning the interior of the duct are inclined with respect to the longitudinal axis of the vehicle body so that the narrowing passage provides a cross-sectional area of the flow channel that is narrowed along the air flow and the widening passage with the cross-sectional area of the flow channel being widened along the air flow. Both passages are formed adjacent to each other.

Consequently, the air-intake duct can be downsized, so that flexibility in designing peripheral components is increased and, simultaneously, air containing little water can be delivered to the air cleaner.

In addition, the air cleaner in combination with the air-intake duct constitutes a structure that can supply cleaner air to the engine.

In the present invention, the air-intake duct provides the vertically divided structure including the upper half member and the lower half member, and the partitions to be formed integrally with the upper half member and the lower half member, respectively.

Owing to the vertically divided structure, the assembly for manufacture and disassembly can be easily performed. Also, the partitions are integrally formed respectively with the upper half and the lower half and are capable of being divided into the upper and lower portions.

In addition, the air flow channel may be of a simple structure having no movable portion.

In the present invention, the air-intake duct has a cross section of substantially a laterally elongated square shape that extends in the direction of the width of the vehicle when viewed from the front. A plurality of partitions are provided in the direction of the width of the vehicle.

With the provision of the plurality of partitions, the air-intake duct can generate an eddy current efficiently on the side of outlet port of the air-intake duct, and can separate water from the intake air.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
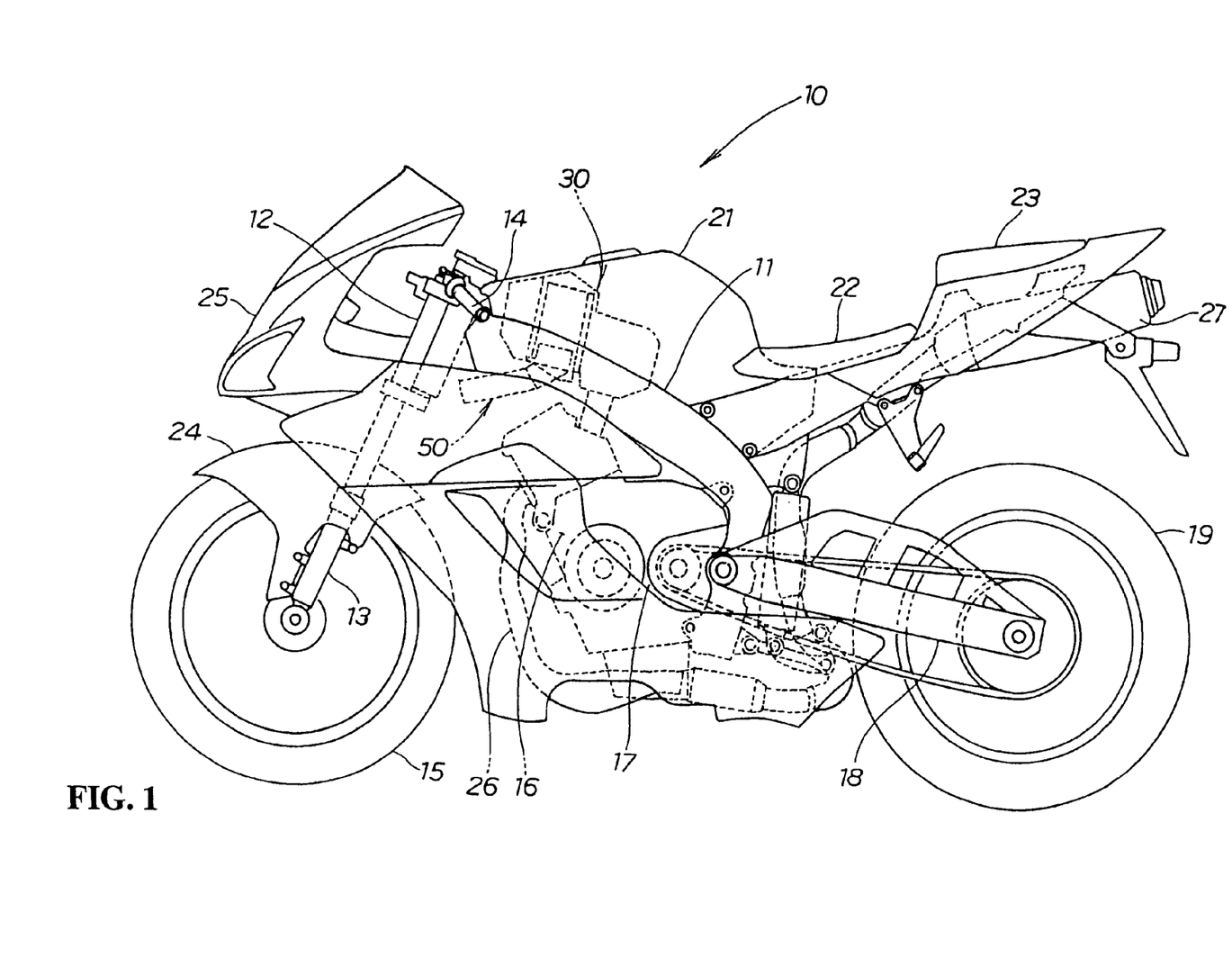
FIG. 1 is a side view of a two-wheel vehicle illustrating the structure of the air cleaner according to the present invention.

Referring now to the attached drawings, a best mode for carrying out the invention will be described. FIG. 1 is a side view of a two-wheel vehicle illustrating the structure of the air cleaner according to the present invention. A motorcycle 10 includes a main frame 11, front forks 13 and a handle 14 both attached to a steering shaft that is rotatably supported by a head pipe 12, which is provided at the front end of the main frame 11. A front wheel 15 is attached to the lower end of the front fork 13. An engine 16 attached below the main frame 11 with a speed changer 17 being provided integrally with the rear portion of the engine 16. A swing arm 18 is attached to the rear portion of the main frame 11 with a rear wheel 19 attached to the rear end of the swing arm 18. A fuel tank 21 is attached on the main frame 11 with a seat 22 attached behind the fuel tank 21. A fellow passenger's seat 23 is attached behind the seat 22.

An air cleaner 30 is disposed behind the head pipe 12 and the handle 14 and above the engine 16.

The air cleaner 30 is provided with an air-intake duct 50 for taking in outside air at the lower front thereof.

A front fender 24 is provided for covering the front wheel 15 with an upper cowl 25 positioned adjacent thereto. An exhaust pipe 26 extends rearwardly from the engine 16 with a muffler 27 being connected to the exhaust pipe 26.

Figure 2:
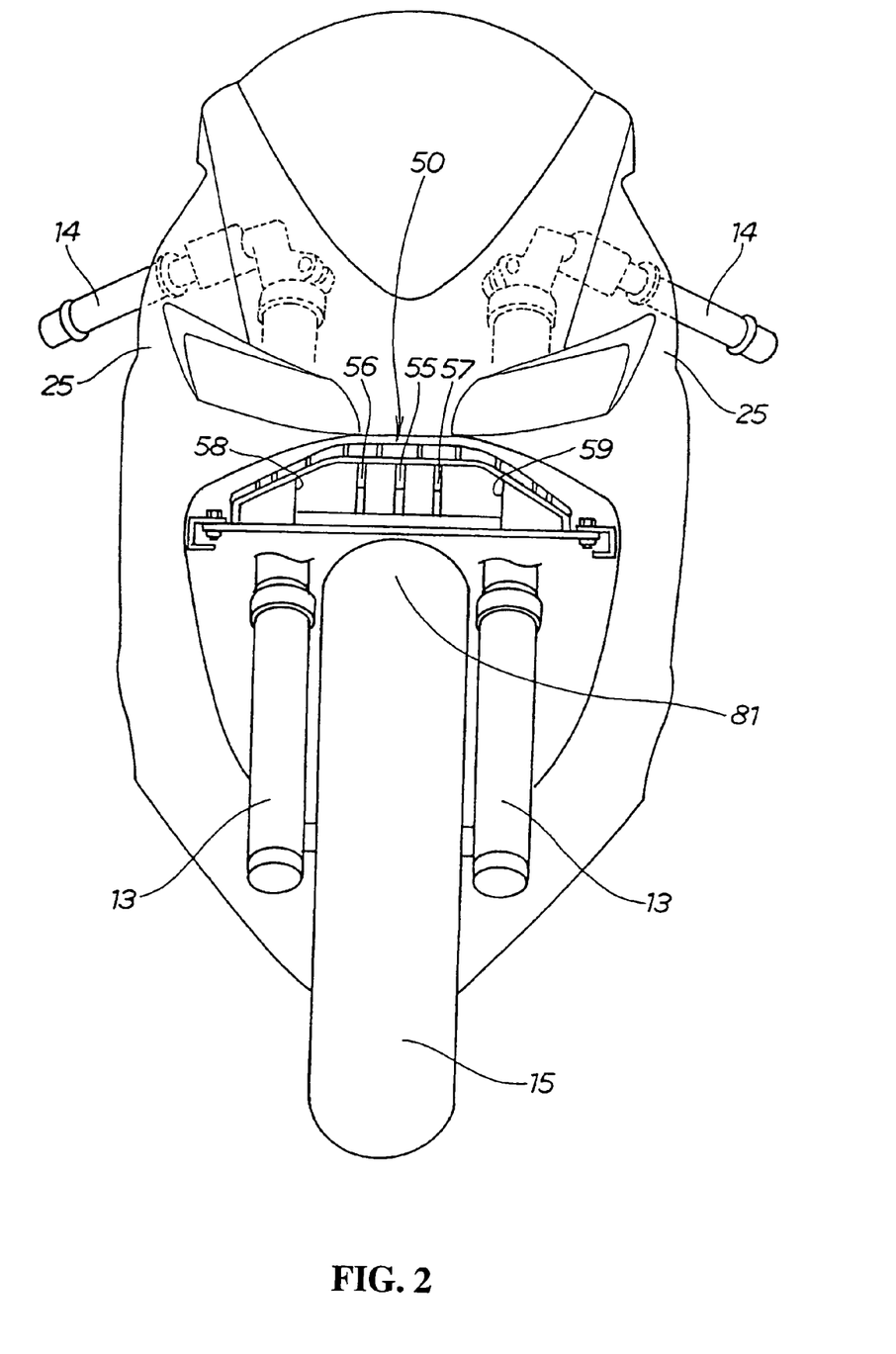
FIG. 2 is a drawing illustrating a principal portion of FIG. 1 when viewed from the front.

FIG. 2 illustrates a principal portion of FIG. 1 when viewed from the front. The air-intake duct 50 is disposed immediately above and behind the upper portion 81 of the front wheel 15 that is disposed between the front forks 13, 13. A central partition 55 is provided together with partitions 56, 57, 58, and 59.

Figure 3:
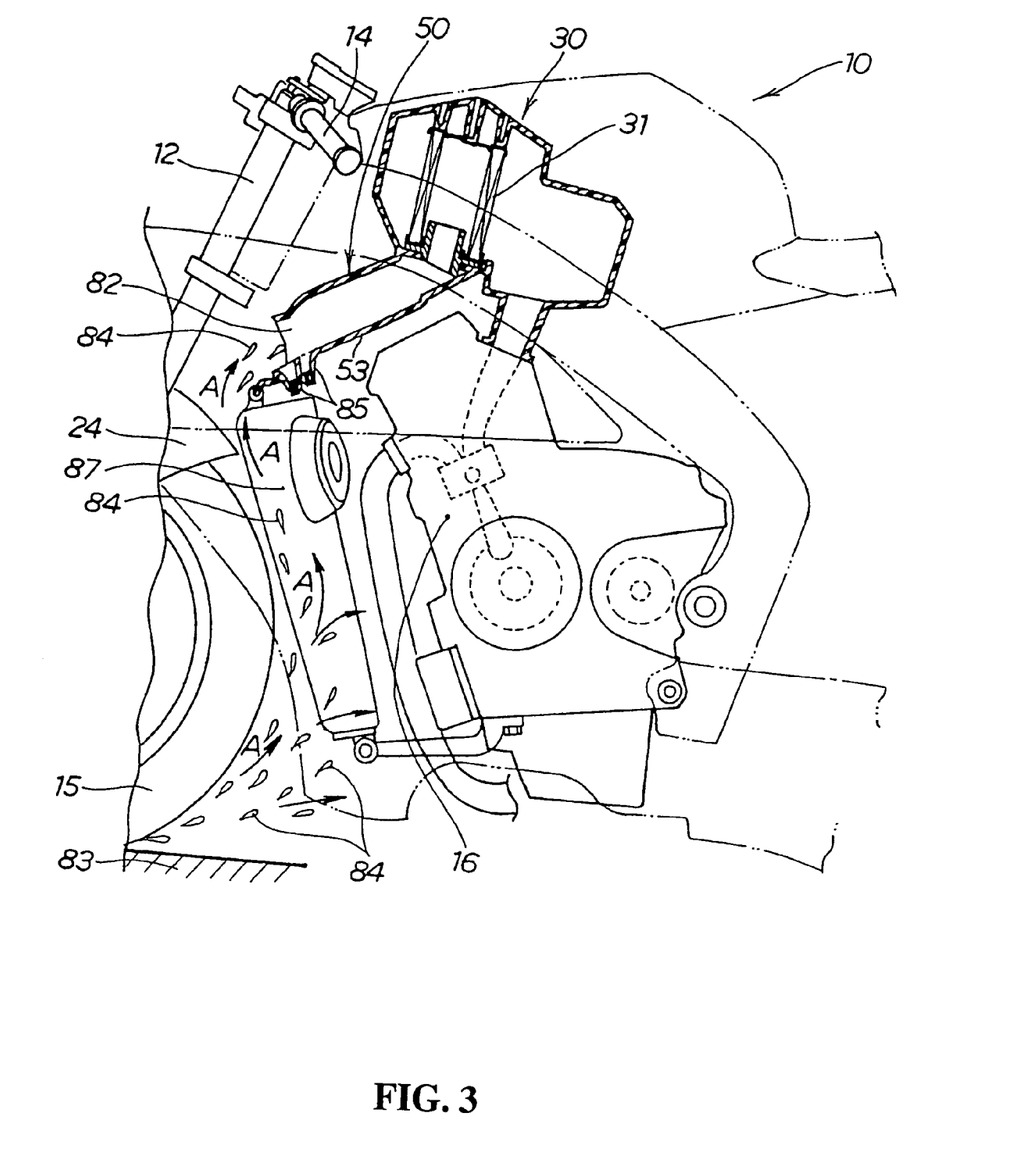
FIG. 3 is a side view showing a positional relation between a front wheel and the air cleaner.

FIG. 3 is a side view showing a positional relationship between the front wheel and the air cleaner. In the air-intake duct 50, an inlet port 82 at the extremity is located in the vicinity of the front wheel 15 located below the front fender 24, and is connected to a radiator 87.

With this positional relation, when the motorcycle 10 is traveling in a puddle or the like, the front wheel 15 splashes water from the ground 83, as indicated by an arrow A upon contact with the ground 83. Thus, part of the splashed water tends to enter the air cleaner 30 side through the inlet port 82 of the air-intake duct 50.

Figure 5:
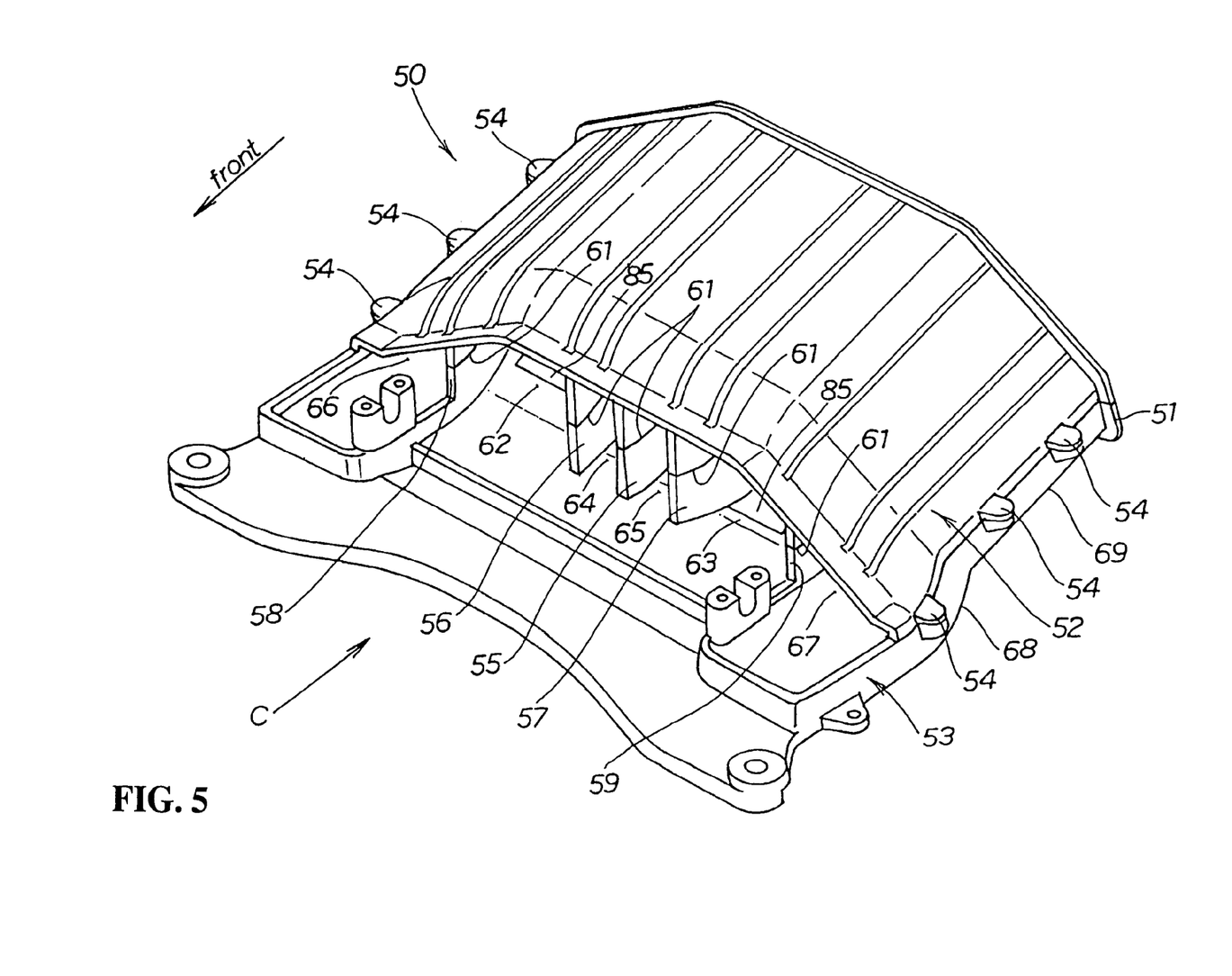
FIG. 5 is a perspective view of an air-intake duct according to the present invention.

Therefore, the air cleaner 30 is provided with the center partition 55 and the partitions 56, 57, 58, 59 in the air-intake duct 50 in order to separate water (See FIG. 5). In addition, the air cleaner 30 is further provided with a water sump 85 on the lower half member 53 of the air-intake duct 50, so that water can further be separated from intake air.

Figure 4:
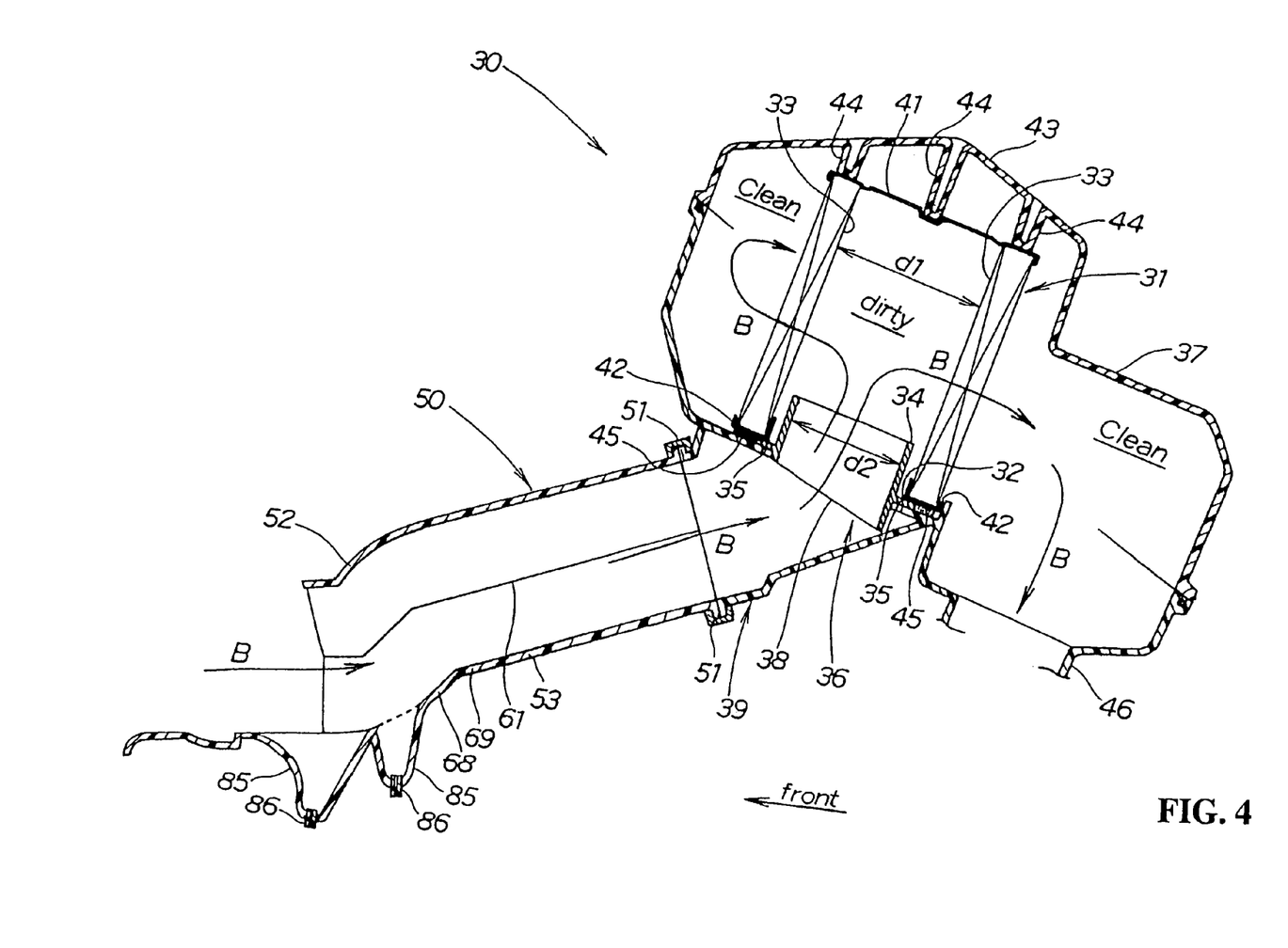
FIG. 4 is a side view showing the structure of the air cleaner according to the present invention.

FIG. 4 is a side view showing the structure of the air cleaner according to the present invention. The air cleaner 30 is a structure including a cylindrical element 31; an air guide member 36 including a guide tube 34 formed to have a diameter d2 smaller than the inner diameter d1 defined between inner walls 33, 33 of the element 31 so as to be inserted from one end 32 of the element 31 and flange members 35, 35 provided on the guide tube 34 for being abutted against one end surface of the element 31. A cleaner case 37 is provided for storing the element 31 and the air guide member 36. A cleaner case connecting member 39 is provided on the lower side of the cleaner case 37 and below the air guide member 36 with the air-intake duct 50 being provided obliquely on the lower side of the cleaner case connecting member 39.

When the air-intake duct 50 with an axis inclined with respect to the axis of the element 31 is provided on the cleaner case 37, an inlet port 38 of the guide tube defines an inclined surface inclined in the same direction as the air-intake duct 50.

An upper lid 41 of the element is provided together with a lower lid 42 of the element and an upper lid 43 of the cleaner case 37. An element holding member 44, is provided together with a rubber member 45 and an air-discharge duct 46.

The air-intake duct 50 includes a structure that is connected to the cleaner case connecting member 39 by means of joint members 51, 51 and includes the upper half member 52 and the lower half member 53 so as to be divided into upper and lower halves along the vertically partitioning line 61. In addition, a round bottom inclined portion 68 and an inclined portion 69 are provided in the longitudinal direction of the vehicle body from the left to the right in FIG. 4.

The air-intake duct 50 is provided with the water sump 85 for storing water entering from outside and a water drainage plug 86 at the midsection of the inclined portion 68.

Air containing water enters through the inlet port of the air-inlet duct 50 as indicated by an arrow B, where the water content is separated therefrom and stored into the water sump 85. Thereafter, the air enters through the inlet port 38 of the guide tube of an air guide member 36 into an dirty side in the interior of the element 31, passes through a clean side thereof, and then enters the engine side from the air-discharge duct.

In the present invention, since an improvement of the structure of the air-intake duct 50 is an important point, the air-intake duct 50 will be described in detail below.

FIG. 5 is a perspective view of the air-intake duct according to the present invention. The air-intake duct 50 provides a structure including the joint members 51 with respect to the cleaner case connecting member 39 (see FIG. 2). The upper half member 52 includes an angled roof with the lower half member 53. Upper and lower combining members 54 (represents that there are plurality of members) are provided for the upper half member 52 and the lower half member 53 with the central partition 55 and the partitions 56, 57 being positioned in the vicinity of the central partitioning 55. The partitions 58, 59 are positioned on both ends thereof with the vertically partitioning lines 61, which correspond to joint portions between the upper halves and the lower halves of the partitions 55, 56, 57, 58, 59 (which are formed integrally with the upper half member 52 and the lower half member 53 of the air-intake duct 50). Narrowing passages 62, 63 are provided wherein the cross-sectional areas of the flow channels are narrowed along an air flow (arrow C). Note, the cross-sectional area is smaller on the outlet side than the inlet side (see FIG. 6). Widening passages 64, 65 are provided wherein the cross-sectional areas of the flow channels are widened along the air flow (arrow C). Note, the cross-sectional area is wider on the outlet side than the inlet side (see FIG. 6). The narrowing passages 62, 63 and the widening passages 64, 65 are surrounded by the partitions 55, 56, 57, 58, 59, and passages 66, 67 wherein the cross-sectional areas of the flow channels are constant.

The narrowing passages 62, 63 and the widening passages 64, 65 are formed so as to be adjacent to each other and are inclined with respect to the longitudinal axis of the vehicle body. The round bottom 68 inclined portion is inclined forwardly of the vehicle body formed on the forward bottom of the air-intake duct 50, and the inclined portion 69 extends rearwardly of the round bottom inclined portion 68 and is inclined forwardly of the vehicle body. The plurality of water sumps 85 project downwardly and are disposed on the front side of the round bottom inclined portion. The water drainage plug 86 (see FIG. 4) for discharging water is provided at the lower end of the water sump 85.

Figure 6:
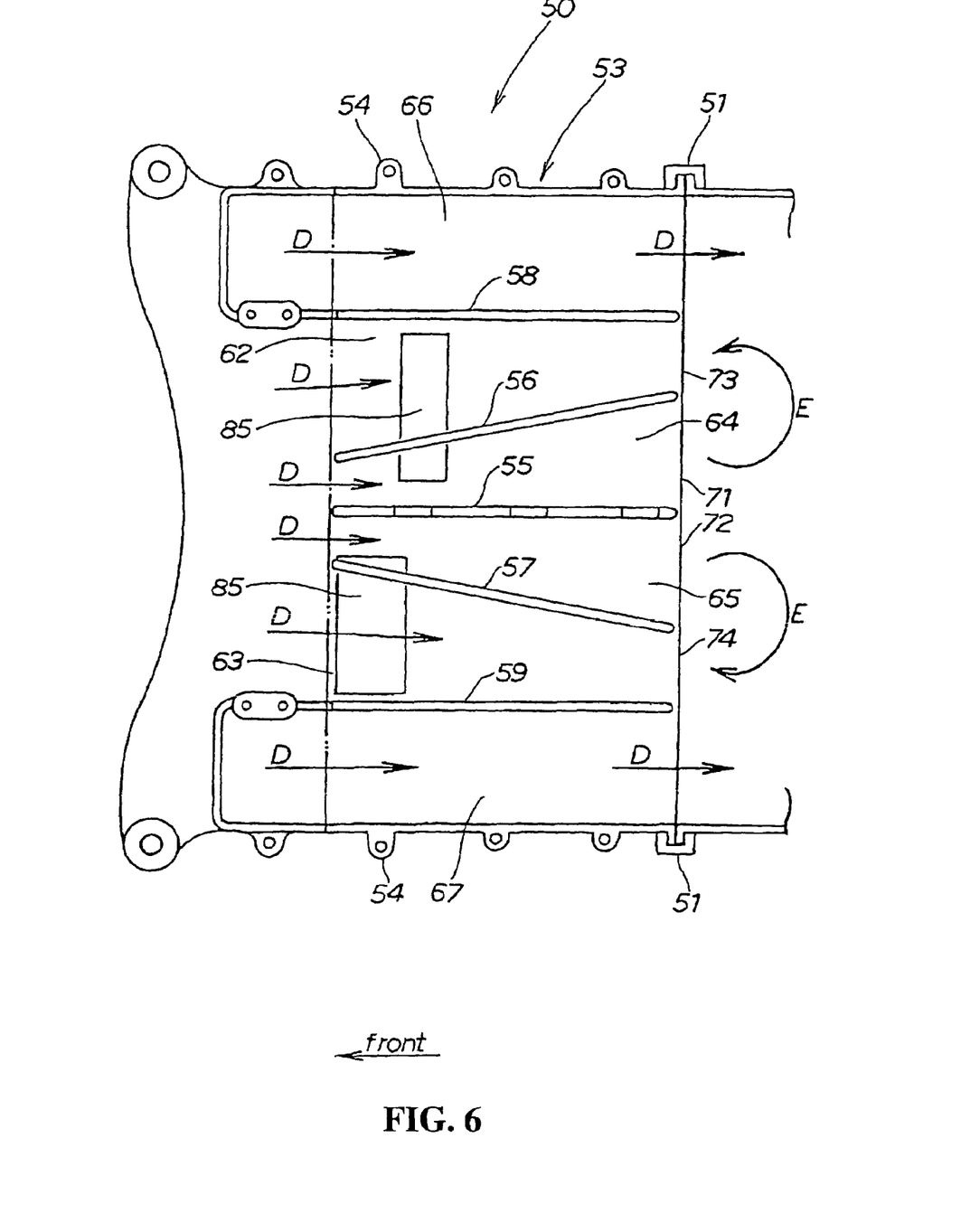
FIG. 6 is an action drawing showing an air flow of a lower half member of the air-intake duct.

FIG. 6 is an action drawing showing the air flow of the lower half member of the air-intake duct, and the lower half member 53 of the air-intake duct 50 when viewed from above. The center partition 55 is disposed at the center with the partitions 56, 57 being disposed symmetrically in the vicinity of the center partition 55. The partitions 58, 59 are disposed at the positions near both ends with the narrowing passages 62, 63 and the widening passages 64, 65 being surrounded by these partitions 55, 56, 57, 58, 59. The water sump 85 is disposed below the left and right partitions 56, 57 at a position sifted in the fore-and-aft direction of the vehicle body.

Air enters from the front of the vehicle body as indicated by an arrow D, and is separated into two routes; one is flowing, at the inlet port of the cleaner case connecting member 39 (not shown), from the outlet ports 71, 72 of the widening passages 64, 65 to the outlet ports 73, 74 of the narrowing passages 62, 63 like an eddy current as indicated by arrows E. The second route flows straight forward as shown at the outlet ports of the passages 66, 67. Water entered into the narrowing passages is attached to the partitions 56, 57, so that it can be separated from the air. Water attaches to the partitions 56, 57 and runs along the inclined portion 69 (see FIG. 5) and the round bottom inclined portion of the lower half member 53 of the air-intake duct 50, and is stored in the water sump 85, from which it is discharged to the outside by means of the water drainage plug 86 (see FIG. 4).

The arrows E show eddy currents flowing from the outlet ports 71, 72 wherein the cross-sectional areas of the flow channels are large relative to the outlet ports 73, 74 wherein the cross-sectional areas of the flow channels are small. This is based on a phenomenon in which the air pressure is high at the outlet ports 71, 72 wherein the cross-sectional areas of the flow channels are large and, in contrast, is low at the outlet ports 73, 74 wherein the cross-sectional areas of the flow-channels are small. Thus, the air flows like an eddy current that is generated from the high-pressure side to the low-pressure side.

As a consequence, water that entered into the widening passage 64 and the narrowing passage 62 is stored in the water sump 85 (see FIG. 4) on the inlet port side of the air-intake duct 50 inclined toward the front.

The air-intake duct has an advantage not only in that a large space is not necessary, but also in that air having little water can be delivered to the air cleaner without impairing a smooth air flow.

The material of the air-intake duct of the present invention may be resin or metal. However, when considering its shape, light weight requirement, and cost reduction, resin is preferable.

The internal structure of the air-intake duct may be of any type as long as the narrowing passage and the widening passage are disposed adjacent to each other, and the number thereof is not limited. Although the air-intake duct of the present application is disposed only one at the upper rear position of the front wheel, there may be a plurality of air-intake ducts disposed separately in the direction of the width of the vehicle body or in the direction of the fore-and-aft direction of the vehicle body.

In addition, although the shape of the cross section of the air-intake duct in the present application is substantially a laterally elongated square, it may be a laterally enlongated square, or a circle.

The air cleaner structure of the present invention is suitable for a two-wheel vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner structure to be mounted to a vehicle comprising:
    an air-intake duct for introducing outside air provided at an inlet port of a cleaner case having an element for cleaning air integrated therein; and
    a plurality of partitions for partitioning the interior of the duct, at least one of said partitions being inclined with respect to a longitudinal axis of the vehicle body forming a first flow channel between the inclined partition and another of the partitions disposed on a first side of the air-intake structure, and also forming a second flow channel on an opposite side to the inclined partition,
    wherein a cross-sectional area of the first flow channel is narrowed to form a narrowing passage in a direction of an air flow, and
    wherein a cross-sectional area of the second flow channel is widened to form a widening passage in the direction of the air flow,
    the narrowing passage and the widening passage overlapping each other when viewed from a side of the vehicle.

2. The air cleaner structure according to claim 1, wherein the air-intake duct has a vertically divided structure having an upper half member and a lower half member, and the partitions are formed integrally with the upper half member and the lower half member, respectively.

3. The air cleaner structure according to claim 2, wherein the air-intake duct has a cross section of substantially a laterally elongated square shape extending in a vehicle width direction when viewed from a front of the vehicle, the plurality of partitions being spaced apart from each other in the vehicle width direction.

4. The air cleaner structure according to claim 2, and further including at least one water sump projecting downwardly from a front side of the air cleaner structure for collecting water therein.

5. The air cleaner structure according to claim 1, wherein the air-intake duct has a cross section of substantially a laterally elongated square shape extending in a vehicle width direction when viewed from a front of the vehicle, the plurality of partitions being spaced apart from each other in the vehicle width direction.

6. The air cleaner structure according to claim 1, wherein the plurality of partitions includes a central partition that is arranged substantially parallel to an outer housing of the air cleaner structure, and at least one partition formed adjacent to and at an angle relative to the central partition for forming the narrowing passage and the widening passage within said air cleaner structure.

7. The air cleaner structure according to claim 6, wherein the plurality of partitions includes partitions that are formed on both sides of the outer housing for forming passages therethrough, and
   a first of the at least one inclined partitions is formed between a partition at a first side of the outer housing and the central partition, and
   a second of the at least one inclined partitions is formed between a partition at a second side of the outer housing and the central partition in order to form two narrowing passages and two widening passages within said air cleaner structure.

8. The air cleaner structure according to claim 7, wherein the partition at the first side of the outer housing together with the first inclined partition form a first of the two narrowing passages, the first inclined partition and the central partition form a first of the two widening passages, the central partition and the second inclined partition form a second of the two widening passages and the second inclined partition and the partition at the second side of the outer housing form a second of the two narrowing passages.

9. The air cleaner structure according to claim 8, wherein air entering into a first widening space formed between the central partition and the first inclined partition, and a second widening space formed between the central partition and the second inclined partition are at higher pressures relative to air entering into narrowing spaces formed between the first inclined partition and the partition at the first side of the outer housing and the second inclined partition and the partition at the second side of the outer housing.

10. The air cleaner structure according to claim 1, wherein an eddy current is formed by air flowing from the widening passage back to the narrowing passage for separating dust and water from the air flowing therein.

11. An air cleaner structure adapted to be mounted on a vehicle comprising:
   an air-intake duct for introducing outside air;
   at least one partition for partitioning the interior of the air-inlet duct, said at least one partition being inclined with respect to an outer side wall of said air-intake duct for forming a first flow channel between the inclined partition and the outer side wall, and forming a second flow channel on an opposite side to the inclined partition,
   wherein a cross-sectional area of the first flow channel is narrowed to form a narrowing passage in a direction of an air flow,
   wherein a cross-sectional area of the second flow channel is widened to form a widening passage in the direction of the air flow,
   the narrowing passage and the widening passage overlapping each other when viewed from a side of the vehicle.

12. The air cleaner structure according to claim 11, wherein the air-intake duct has a vertically divided structure having an upper half member and a lower half member, and the at least one partition is formed integrally with the upper half member and the lower half member, respectively.

13. The air cleaner structure according to claim 12, wherein the air-intake duct has a cross section of substantially a laterally elongated square shape extending in a vehicle width direction when viewed from a front of the vehicle, and
   the at least one partition is spaced apart from the outer side wall in the vehicle width direction.

14. The air cleaner structure according to claim 12, and further including at least one water sump projecting downwardly from a front side of the air cleaner structure for collecting water therein.

15. The air cleaner structure according to claim 11, wherein the air-intake duct has a cross section of substantially a laterally elongated square shape extending a vehicle width direction when viewed from a front of the vehicle, and
   the at least one partition is spaced apart from the outer side wall in the vehicle width direction.

16. The air cleaner structure according to claim 11, wherein the at least one partition includes a central partition that is arranged substantially parallel to an outer housing of the air cleaner structure and at least one partition formed adjacent to and at an angle relative to the central partition for forming the narrowing passage and the widening passage within said air cleaner structure.

17. The air cleaner structure according to claim 16, wherein the at least one partition includes partitions that are formed on both sides of the outer housing for forming passages therethrough,
   and a first one of the at least one inclined partitions is formed between a partition at a first side of the outer housing and the central partition, and
   a second one of the at least one inclined partitions is formed between a partition at a second side of the outer housing and the central partition in order to form two narrowing passages and two widening passages within said air cleaner structure.

18. The air cleaner structure according to claim 17, wherein the partition at the first side of the outer housing together with a first inclined partition form one of the two narrowing passages, the at least one inclined partition and the central partition form a first of the two widening passages, the central partition and a second inclined partition form a second of the two widening passages, a second inclined partition and a second side of the outer housing form a second of the two narrowing passages.

19. The air cleaner structure according to claim 18, wherein air entering into a first widening space formed between the central partition and the first inclined partition, and a second widening space formed between the central partition and the second inclined partition are at higher pressures relative to air entering into narrowing spaces formed between the first inclined partition and the partition on the first side of the outer housing and the second inclined partition and the partition at the second side of the outer housing.

20. The air cleaner structure according to claim 11, wherein an eddy current is formed by air flowing from the widening passage back to the narrowing passage for separating dust and water from the air flowing therein.

* * * * *